United States Patent
Kato et al.

(10) Patent No.: US 6,740,255 B2
(45) Date of Patent: May 25, 2004

(54) PHOTO-RESPONSIVE LIQUID CRYSTAL COMPOSITION, INFORMATION-RECORDING MEDIUM AND INFORMATION-RECORDING PROCESS

(75) Inventors: Takashi Kato, Kawasaki (JP); Masaya Moriyama, Tokyo (JP); Norihiro Mizoshita, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/364,394

(22) Filed: Feb. 12, 2003

(65) Prior Publication Data

US 2003/0160213 A1 Aug. 28, 2003

(30) Foreign Application Priority Data

Feb. 21, 2002 (JP) ........................................ 2002-044622

(51) Int. Cl.⁷ ..................... C09K 19/52; C09K 19/54; G01B 7/00; G01B 7/24
(52) U.S. Cl. ..................... 252/299.01; 252/299.5; 252/299.7; 349/2; 369/30.04; 369/30.09; 369/47.27; 369/275.3; 430/270.11
(58) Field of Search ..................... 252/299.5, 299.7, 252/299.01; 349/2; 369/30.04, 30.09, 47.27, 275.3; 430/270.11

(56) References Cited

U.S. PATENT DOCUMENTS

| 4,803,287 A | 2/1989 | Hibino et al. |
| 5,936,878 A | 8/1999 | Arsenov et al. |
| 6,074,710 A | 6/2000 | Kato et al. |
| 6,333,081 B1 | 12/2001 | Horikiri et al. |

FOREIGN PATENT DOCUMENTS

| EP | 0 566 233 | 10/1993 |
| EP | 0 896 048 | 2/1999 |
| EP | 1 236 785 | 9/2002 |
| JP | 05-247084 | 9/1993 |

OTHER PUBLICATIONS

J.–H. Sung, et al., Chemistry of Materials, vol. 14, No. 1, pp. 385–391, Accession No. 7539113, XP–002240647, "Dynamics of Photochemical Phase Transition of Guest/Host Liquid Crystals with an Azobenzene Derivative as a Photoresponsive Chromophore", Jan. 2002 (abstract only).

A. Seeboth, et al., Colloid and Polymer Science, vol. 272, No. 3, pp. 348–351, XP–002082156, "Thermotropic Liquid Crystals Embedded in a High Water Gel System", 1994.

*Primary Examiner*—Shean C. Wu
(74) *Attorney, Agent, or Firm*—Oblon, Spivak, McClelland, Maier & Neustadt, P.C.

(57) ABSTRACT

Disclosed is a photo-responsive liquid crystal composition which is composed of a liquid crystalline compound and a gelling agent, an information-recording medium and an information-recording process making use of the information-recording medium. The gelling agent consists of a photochromic compound having a group capable of forming an intermolecular hydrogen bond in its molecule as well as a photo-responding site of a specific structure. The composition can exist in any state of gel of a first phase and gel of a second phase and can undergo changes in state between the gel of the first phase and the gel of the second phase. The information-recording medium has a recording layer formed of the composition, and the information-recording process utilizes changes in state between the gel phases in the recording layer.

10 Claims, 2 Drawing Sheets

PHOTO-RESPONSIVE LIQUID CRYSTAL COMPOSITION, INFORMATION-RECORDING MEDIUM AND INFORMATION-RECORDING PROCESS

BACKGROUND OF THE INVENTION

1. Field of the Invention

The present invention relates to a photo-responsive liquid crystal composition, and an information-recording medium and an information-recording process making use of this liquid crystal composition.

2. Description of the Background Art

In recent years, attention has been attracted to the so-called supermolecule materials formed by a phenomenon that self-coalescence or self-organization of molecules is caused by a non-covalent bonding intermolecular interaction such as hydrogen bonding. In particular, a substance called "liquid crystal physical gel" contains, a liquid crystal that is a functional fluid as a solvent, and has both optical properties and electrical properties as a liquid crystal, and has a nature as a soft solid that is called physical gel, and hence attracts one's attention as novel functional materials.

The physical gel is such that is gelled by causing molecules to coalesce in the form of fibers by an intermolecular interaction such as hydrogen bonding to form a network and taking a solvent therein. In addition, the microscopic intermolecular interaction of this physical gel can be changed according to external stimulation or external environment. As a result, the gel has a possibility that the coalesced state or organized form of the gel may be changed. These changes finally come to bring macroscopic physical changes in the physical gel. Accordingly, the liquid crystal physical gel capable of controlling the coalesced form or organized form thereof by external stimulation is expected as a really novel polyfunctional material or highly functional material.

Temperature, electric field, light, etc. are considered as examples of external stimulation for controlling the functions related to the coalesced form or organized form of the liquid crystal physical gel. In particular, stimulation by light is extremely useful in that:

(1) stimulation can be selectively given to a specified part, particularly, a minute region, for example, about several hundred nanometers, at the least,
(2) the intensity of stimulation can be easily controlled, and
(3) stimulation can be given in a state brought into no contact with the material.

With respect to such liquid crystal physical gel, it has been reported to use, for example, an azobenzene compound as a gelling agent (Chem. Mater., 12, 3667 (2000); J. Mater. Chem., 11, 1339 (2001)).

An azobenzene compound itself is a photochromic compound undergoing isomerization from a trans-form to a cis-form by irradiation of ultraviolet light and isomerization from the cis-form to the trans-form by irradiation of visible light or heating.

However, there has been proposed to date nothing about the utilisation of fact that the photo-responsibility of a photochromic compound such as an azobenzene compound for the purpose of controlling the coalesced form or organized form of the liquid crystal physical gel.

SUMMARY OF THE INVENTION

The present inventors have carried out repeated researches as to changes in structure or phase state of a gelling liquid crystal composition, which is obtained by mixing a gelling agent composed of a specific photochromic compound such as an azobenzene compound with a liquid crystalline compound due to molecular coalescence or organization of the composition, which are caused by stimulation by light. As a result, the present invention has been led to completion.

It is the first object of the present invention to provide a photo-responsive liquid crystal composition which is composed of a liquid crystalline compound and a gelling agent consisting of a photochromic compound, may exist in any state of gel of a first phase and gel of a second phase different from the first phase, and may undergo changes in phase state between the gel of the first phase and the gel of the second phase.

The second object of the present invention is to provide an information-recording medium having a recording layer formed of the photo-responsive liquid crystal composition described above.

The third object of the present invention is to provide an information-recording process making use of the information-recording medium described above.

According to the present invention, there is thus provided a photo-responsive liquid crystal composition comprising a liquid crystalline compound and a gelling agent mixed with the liquid crystalline compound to form a gelling mixture, wherein the gelling agent consists of a photochromic compound having a group capable of forming an intermolecular hydrogen bond in its molecule as well as a photo-responding site due to at least one of an azobenzene structure, a spiropyran structure, a fulgide structure and a diarylethene structure, and wherein the composition may exist in any state of gel of a first phase and gel of a second phase different from the first phase and may undergo changes in phase state between the gel of the first phase and the gel of the second phase.

In the photo-responsive liquid crystal composition according to the present invention, the gelling agent may preferably be an azobenzene compound represented by the following general formula (1):

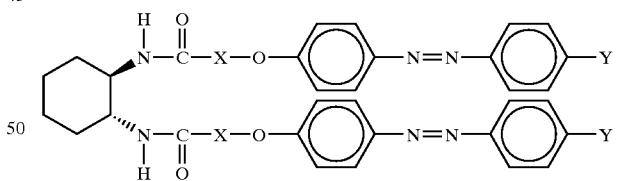

General formula (1)

wherein X is a divalent organic group, and Y is a monovalent organic group.

According to the present invention, there is also provided an information-recording medium comprising a recording layer formed by the photo-responsive liquid crystal composition described above.

According to the present invention, there is further provided an information-recording process making use of the information-recording medium described above, which comprises the step of irradiating a selected region or regions of the recording layer of the information-recording medium with light according to information to be recorded, thereby forming an information-recorded portion of the gel of the second phase of a pattern according to the information in a matrix of the gel of the first phase, and fixing the information to the recording layer.

According to the present invention, there is still further provided an information-recording process, comprising the steps of irradiating a recording layer formed by a photo-responsive liquid crystal composition composed of a nematic liquid crystalline compound and the gelling agent described above with ultraviolet light according to information to be recorded in a state that the phase of the recording layer is nematic gel, thereby changing a selected region or regions of the nematic phase to a cholesteric phase of a sol state, irradiating the cholesteric phase of the sol state with visible light, thereby changing the cholesteric phase of the sol state to a cholesteric phase of a gel state to form an information-recorded portion of the cholesteric phase of the gel state of a pattern according to the information in a matrix of the nematic phase of the gel state, and fixing the information to the recording layer.

The process may further comprise the step of heating the recording layer having the cholesteric phase of the gel state, thereby changing the whole phase of the recording layer to nematic gel to erase the fixed information.

In such a photo-responsive liquid crystal composition as described above, the gelling agent mixed with the liquid crystalline compound is a photochromic compound having a group capable of forming an intermolecular hydrogen bond in its molecule as well as a specific photo-responding site, whereby the chirality of the gelling agent is reflected on the liquid crystalline compound according to the change in gelling ability due to photo-isomerization of the gelling agent, i.e., the change in solubility thereof in the liquid crystalline compound. As a result, a gelled nematic liquid crystal, for example, may be changed to a cholesteric phase of a sol state, and this cholesteric phase of the sol state may be further changed to a cholesteric phase of a gel state. The photo-responsive liquid crystal composition may thereby exist in any state of gel of a first phase and gel of a second phase different from each other and may undergo changes in state between the gel of the first phase and the gel of the second phase.

According to the composition, a state that the gel of the second phase has stably coexisted in a selected region or regions of a matrix of the gel of the first phase may be formed, so that information by proper light or image information can be recorded by utilizing the characteristics.

Further, the recording layer is heated, whereby the whole recording layer may be changed to an isotropic phase, thereby erasing the information recorded in the recording layer. In addition, the recording layer can be used in recording of new information.

BRIEF DESCRIPTION OF THE DRAWING

The above and other objects, features and advantages of the present invention will become apparent from the following description and the appended claims, taken in conjunction with the accompanying drawings, in which:

DETAILED DESCRIPTION OF THE PREFERRED EMBODIMENTS

Figure 1:
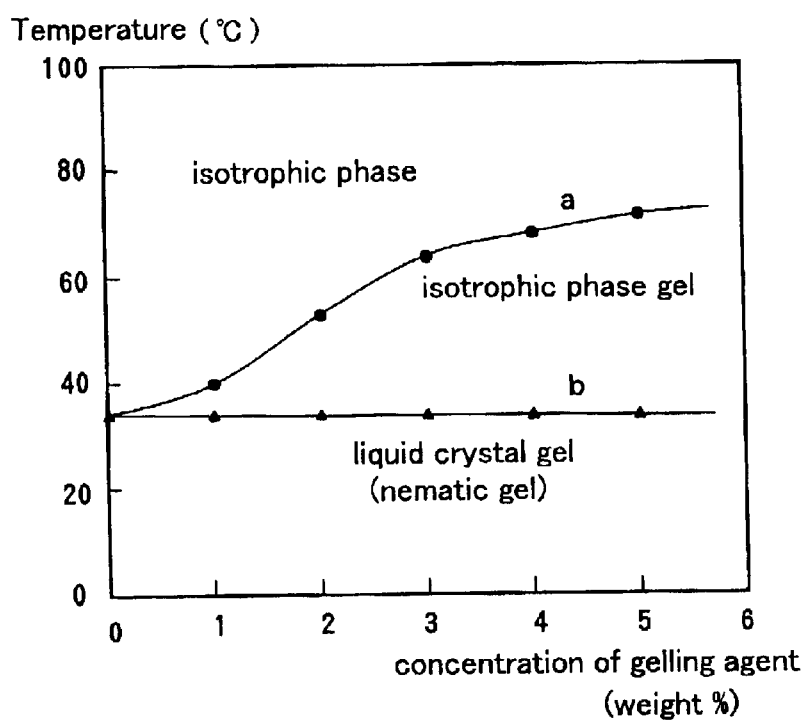
FIG. 1 is a characteristic curve diagram illustrating the phase transition behavior of an exemplary photo-responsive liquid crystal composition according to the present invention when the concentration of a gelling agent in the composition is variously changed.

The embodiments of the present invention will hereinafter be described in details.

The photo-responsive liquid crystal composition according to the present invention comprises a liquid crystalline compound and a gelling agent consisting of a specific photochromic compound. The composition has characteristics that it may take different phase states, which are both in gel states and can undergo changes in state between the different phases, by virtue of the combination of the liquid crystalline compound with the gelling agent. The term "different phase states" as used herein means separate phase states different in the coalesced form or organized form of molecules from each other.

The liquid crystalline compound used in the present invention is selected from various liquid crystalline compounds heretofore used in liquid crystal display devices, specifically, liquid crystalline compounds exhibiting a nematic phase, smectic phase, cholesteric phase or discotic phase, for example, biphenyl compounds, phenylcyclohexane compounds, phenylpyrimidine compounds, cyclohexylcyclohexane compounds and the like which are described in "Liquid Crystal Device Handbook" edited by No. 142 committee in the Japan Society for the Promotion of Science (1989), pp. 154–192 and pp. 715–722, or mixtures thereof. The liquid crystalline compound may be either positive or negative in anisotropy of dielectric constant.

As specific preferable examples of the liquid crystalline compounds, may be mentioned compounds represented by the following formulae (i) to (iii) and those specified by "E7" and "E63" produced by Merck Co.

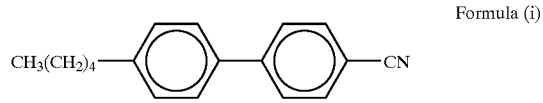

Formula (i)

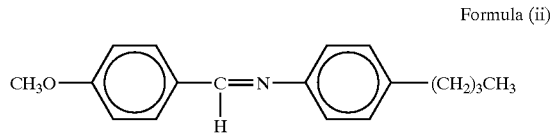

Formula (ii)

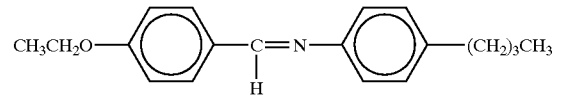

Formula (iii)

The gelling agent used in the present invention is basically a substance forming a gelling mixture by mixing it with a liquid crystalline compound used, i.e., a compound capable of imparting such properties that its mixture with the liquid crystalline compound will become a mixture having gelling nature and selected from photochromic compounds having a group capable of forming an intermolecular hydrogen bond in their molecules as well as a photo-responding site due to at least one of an azobenzene structure, a spiropyran structure, a fulgide structure and a diarylethene structure.

The term "group capable of forming an intermolecular hydrogen bond" as used herein means a group capable of forming a hydrogen bond between molecules of said compound. As examples thereof, may be mentioned an —NHCO— group and other groups composed of a combination of —NH— group and —CO— group.

As the gelling agent in the present invention, may preferably be used, for example, an azobenzene compound (hereinafter referred to as "specific azobenzene compound") represented by the above general formula (1).

In the general formula (1), X is a divalent organic group and is not particularly limited. However, specific preferable examples thereof include alkylene groups having 1 to 20 carbon atoms, preferably 4 to 16 carbon atoms, more preferably 8 to 12 carbon atoms.

Y is a monovalent organic group and is not particularly limited. However, specific preferable examples thereof include alkyl groups having 1 to 10 carbon atoms, preferably 4 to 8 carbon atoms, alkoxy groups having 1 to 10 carbon atoms, preferably 4 to 8 carbon atoms, a cyano group and a nitro group.

The specific azobenzene compound is a photochromic compound having a group capable of forming an intermolecular hydrogen bond of —NHCO— group and undergoing isomerization from a trans-form to a cis-form by irradiation of ultraviolet light and isomerization from the cis-form to the trans-form by irradiation of visible light or heating. This isomerization is due to isomerization of azobenzene represented by the following formula (A):

Formula (A)

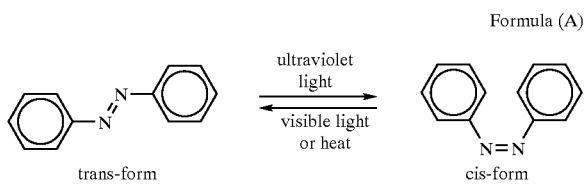

For example, a specific azobenzene compound represented by the following structural formula (1), i.e., an azobenzene compound, in which X is an alkylene group having 10 carbon atoms, and Y is a cyano group in the general formula (1), is preferably used.

Structural formula (1)

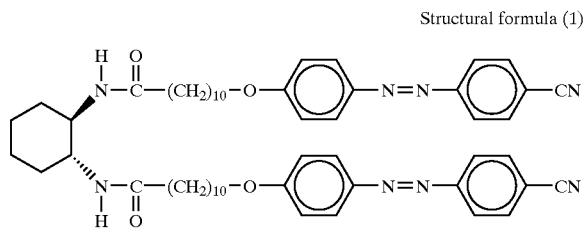

The photo-responsive liquid crystal composition according to the present invention is related to a specific combination of a liquid crystalline compound with the gelling agent described above, and a typical example thereof is a composition (hereinafter referred to as "Specific Composition M") obtained by combining the liquid crystalline compound, 4-cyano-4'-n-pentylbiphenyl as represented by the above formula (i) with a gelling agent consisting of the specific azobenzene compound represented by the structural formula (1).

Specific Composition M has characteristics that it behaves in the following manner by various treatments including irradiation of light to exhibit various phase states. Since the gelling agent has a photo-responding site, the behavior is varied by whether light irradiation is performed or not.

(1) Case Where No Light Irradiation is Performed:

When no light irradiation is performed, most of the photochromic compound as the gelling agent is in a trans-form. As a result, Specific Composition M is generally in a state of nematic gel at room temperature.

FIG. 1 shows a characteristic curve diagram illustrating the phase transition behavior of Specific Composition M when the concentration of the gelling agent in the composition is variously changed.

Specific Composition M is in an isotropic phase under a high-temperature environment and becomes isotropic gel as the temperature lowers, and becomes a state of liquid crystal gel (nematic gel) as the temperature further lowers.

These changes in phase state are reversibly caused depending on the temperature, and an isotropic phase-isotropic gel transition temperature indicated by a curve a becomes higher as the concentration of the gelling agent increases and is changed in such a manner as it gradually comes near to saturation. On the other hand, a liquid crystal gel-isotropic gel transition temperature indicated by a curve b is scarcely changed depending on the concentration of the gelling agent and is near upon about 34° C. This is considered to be attributable to the fact that the compound as the gelling agent is in a trans-form, and the liquid crystalline compound is in a phase separated state microscopically, so that the liquid crystal phase transition temperature of the liquid crystalline compound is developed as it is.

(2) Case Where Light Irradiation is Performed:

When light irradiation is performed, Specific Composition M undergoes structural changes due to photo-isomerization of the specific azobenzene compound as the gelling agent, whereby 3 different phase states of nematic gel, a cholesteric phase of a sol state (hereinafter may also be referred to as "cholesteric sol") and a cholesteric phase of a gel state (hereinafter may also be referred to as "cholesteric gel") are formed at room temperature, and the composition can exist in any state of the respective phase states and can undergo changes among the respective phase states.

Figure 2:
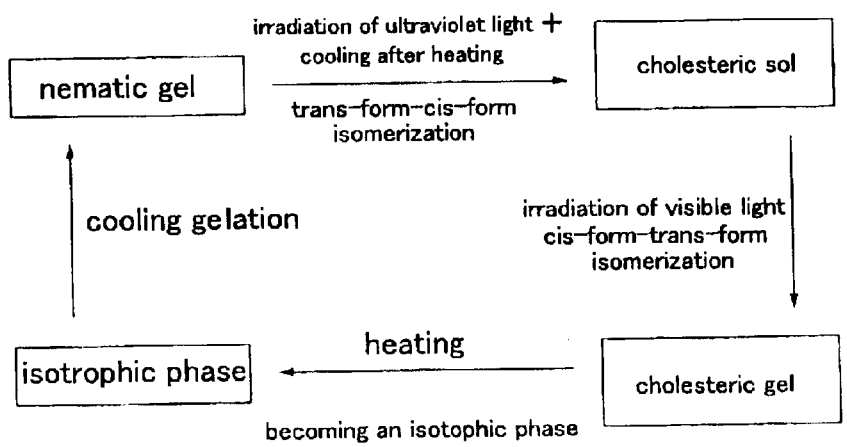
FIG. 2 diagrammatically illustrates a process of structural changes of the above photo-responsive liquid crystal composition by irradiation of light.

FIG. 2 diagrammatically illustrates a process of structural changes of Specific Composition M induced by light.

When Specific Composition M containing the gelling agent in a proportion of, for example, 3.5% by mass is prepared, and once the nematic gel thereof is heated to 120° C., the gelling agent of a trans-form is uniformly dispersed in the liquid crystalline compound, whereby the composition becomes a state of an isotropic phase in which no light scattering occurs. The reason why once the composition is heated to a high temperature as described above is to cause the gelling agent to absorb ultraviolet light efficiently in the composition thereby causing photo-isomerization in high efficiency.

When the composition is cooled to room temperature (for example, 25° C.) while irradiating the sample of such nematic gel with ultraviolet light as illustrated in FIG. 2, a state that the gelling agent of a cis-form is contained in a considerable proportion is achieved. However, the composition just after irradiated with the ultraviolet light becomes cholesteric sol at room temperature, and does not become gel.

When this cholesteric sol is observed through a polarization microscope, a fingerprint pattern having a pitch of, for example, about 10 μm is observed. This is considered to be attributable to the fact that the gelling agent has no gelling ability because it is in the cis-form, and is dissolved in the liquid crystalline compound of the nematic phase, and so the cholesteric phase is induced by the chirality of the gelling agent itself.

When this cholesteric sol is irradiated with visible light at room temperature by, for example, leaving it to stand in a light room, the compound as the gelling agent of the cis-form is isomerized to a trans-form. As a result, the composition is gelled into cholesteric gel. In this cholesteric gel, the fingerprint pattern in the cholesteric sol is retained.

This is due to the fact that the liquid crystalline compound of the cholesteric phase in the state of sol induced by dissolving the gelling agent of the cis-form therein is returned to its original nematic phase to form microscopic nematic gel. In the resultant gel, however, the cholesteric structure is retained without vanishing.

The reason why such a phenomenon occurs is considered to be attributable to the fact that in this process, while the cholesteric structure is used as the so-called mold or template at first to form aggregates of gel, the cholesteric structure is stably fixed by the network of the gel thereafter.

The cholesteric gel formed in such a manner is stable at room temperature and can stably retain its state for at least 6 months.

When the cholesteric gel is heated, the network of the gel is cut, the composition becomes an isotropic phase state. When the composition is then cooled, it is returned to its original nematic gel.

As described above, Specific Composition M can become any state of gel of a first phase and gel of a second phase different from each other in structure or organized form, which are called nematic gel and cholesteric gel, respectively, at room temperature, and can undergo changes between these phase states.

Accordingly, in the liquid crystal recording layer formed by this composition, a selected portion or portions of the nematic gel layer can be changed to cholesteric gel by irradiating the recording layer with light according to image information, and thus an information-recording medium can be provided with such a liquid crystal recording layer.

In this information-recording medium, the information recorded in the form of cholesteric gel is erased by heating the recording layer as described above, so that rewriting of information becomes feasible. The information-recording medium is extremely useful because it can be used repeatedly.

In the present invention, the proportion of the gelling agent in the photo-responsive liquid crystal composition varies according to the combination of the liquid crystalline compound and the gelling agent, and is, for example, 0.05 to 30.0% by mass, preferably 0.5 to 10.0% by mass, more preferably 1.0 to 5.0% by mass, particularly preferably 1.5 to 4.0% by mass.

If the proportion of the gelling agent is too low, there is a possibility that the state of the resulting gel may become unstable. If the proportion of the gelling agent is too high on the other hand, there is a possibility that the intended properties may not be achieved because changes in phase state of the liquid crystalline compound do not clearly occur.

The information-recording medium according to the present invention has a liquid crystal layer formed of the photo-responsive liquid crystal composition as a recording layer, and no particular limitation is imposed on other specific structures, and so any of structures of the conventionally known, various liquid crystal display devices can be adopted.

Figure 3:
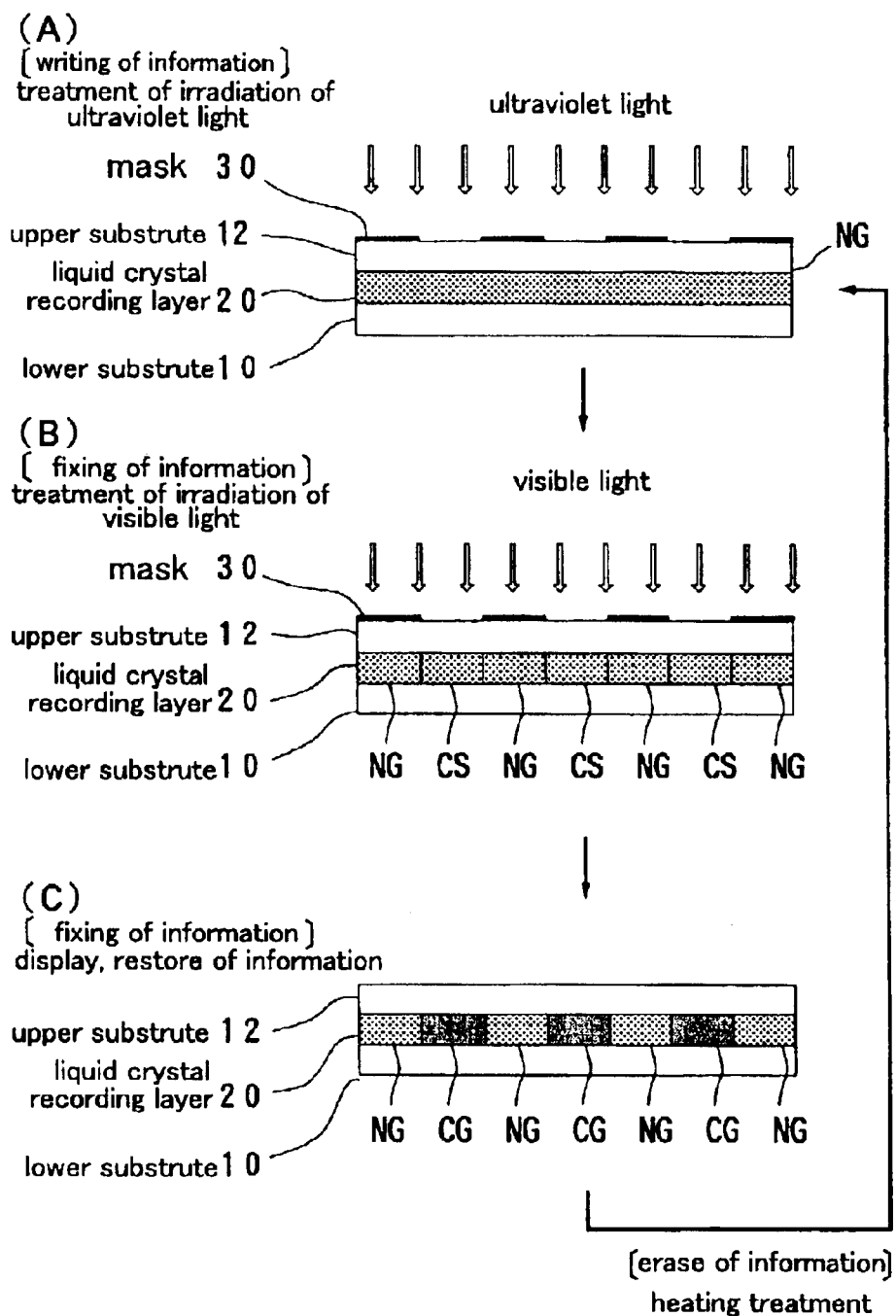
FIGS. 3A to 3C typically illustrate states of an information-recording medium and changes in state in an information-recording process according to the present invention in the order of steps.

The liquid crystal recording layer is generally formed between 2 substrates arranged in opposition to each other (see FIG. 3A).

The thickness of the recording layer is suitably set according to the kinds of components in the photo-responsive liquid crystal composition, and the like, and for example, it is preferably 1 to 50 μm, more preferably 5 to 25 μm.

One or both of the substrates between which the recording layer is formed are formed of a transparent material. Materials for forming the substrates may be either rigid materials such as glass plates and metal plates or flexible materials such as resin films.

The recording layer can be formed by applying a liquid of the above-described photo-responsive liquid crystal composition to the surface of the substrate by means of a coating device such as a spin coater, bar coater or roll coater.

According to the information-recording medium of the present invention, due to the properties of the photo-responsine liquid crystal composition which forms the recording layer, phase states which are in the form of gel and different from each other are selectively formed according to information to be recorded, whereby the information can be fixed to the recording layer by gel of the second phase in gel of the first phase as a matrix. The information recorded in the recording layer can be displayed by transmitted light or reflected light of this recording layer.

Since the state of the photo-responsive liquid crystal composition in the recording layer can be changed to a state of an isotropic phase by heating the recording layer, the recorded information can be thereby erased. This recording layer can be used again in recording of information. Accordingly, the information-recording medium according to the present invention can be used repeatedly.

An information-recording medium according to an embodiment of the present invention and an exemplary information-recording process making use of the information-recording medium will hereinafter be described specifically with reference to FIGS. 3A to 3C.

In this embodiment, the information-recording medium comprises a lower substrate 10 and an upper substrate 12 arranged in parallel over the lower substrate 10 and is constructed by forming a liquid crystal recording layer 20 by charging, for example, the above-described Specific Composition M in a space between the lower substrate 10 and the upper substrate 12 as illustrated in FIG. 3A.

When the liquid crystal recording layer 20 of the information-recording medium is irradiated with ultraviolet light in its selected regions through a photo mask 30, as illustrated in FIG. 3A, in a state that the phase of the liquid crystal recording layer 20 is nematic gel NG, a cholesteric phase CS of a sol state is formed in the regions irradiated with the ultraviolet light, while the nematic gel NG remains in the regions shielded from the ultraviolet light by the photo mask 30 (see FIG. 3B).

Accordingly, a photo mask 30 of a pattern corresponding to image information to be recorded is used, whereby writing of the image information is practiced. This photo mask 30 may be the so-called original image.

When the information-recording medium in this state is irradiated with visible light as illustrated in FIG. 3B, the cholesteric sol CS is converted into cholesteric gel CG by the visible light as illustrated in FIG. 3C, and the cholesteric gel CG becomes an information-recorded portion.

The phase state of this cholesteric gel CG is stable at room temperature, and thus the image information written in the liquid crystal recording layer 20 is fixed by the action of the visible light.

The state illustrated in FIG. 3C is a state that the portion of the cholesteric gel CG has been formed in the selected regions in the matrix of the nematic gel NG according to the image information, and the image information by the cholesteric gel CG is fixed. Since this state is stable as described above, a state that the image information has been fixed is achieved in fact.

According to the image-recording medium in such a state, therefore, the image information recorded in the liquid crystal recording layer 20 can be read out or displayed, and storage of the image information comes to be achieved.

When the liquid crystal recording layer 20 of the information-recording medium in the state that the image information has been recorded in such a manner is heated, the cholesteric gel in the liquid crystal layer 20 is changed to nematic gel through an isotropic phase, and so the whole phase of the recording layer becomes a state of nematic gel. This state is the state illustrated in FIG. 3A.

Accordingly, this information-recording medium is used to practice writing and fixing of information again in accordance with the same process as described above, whereby recording of new image information can be achieved, and the recorded information can be erased by the erasing operation by heating.

The present invention will hereinafter be described specifically by the following example. However, the present invention is not limited to this example.

EXAMPLE 1

Specific Composition M containing a gelling agent at a concentration of 3.5% by mass was prepared by using 4-cyano-4'-n-pentylbiphenyl as a liquid crystalline compound and a specific azobenzene compound represented by the structural formula (1) as the gelling agent.

Two glass substrates were provided, and the Specific Composition M described above in a liquid state was applied to one side of one substrate, and the other substrate was laid thereon to fix them, thereby fabricating an information-recording medium having the construction in accordance with the example illustrated in FIGS. 3A to 3C and containing a liquid crystal recording layer having a thickness of 5.0 µm.

The information-recording medium as above was used, and the liquid crystal recording layer was heated to a temperature of 120° C. while irradiating with ultraviolet light having a wavelength of 365 nm obtained through a filter among light emitted from an extra-high pressure mercury lamp having consumption power of 500 W from the side of one substrate through a photo mask and then cooled to 25° C., thereby writing information according to the photo mask.

The information-recording medium was then irradiated with visible light in a wavelength range of at least 430 nm in wavelength obtained through a filter among light emitted from a same extra-high pressure mercury lamp as described above without removing the photo mask, thereby fixing the information.

In the information-recording medium thus obtained, cholesteric gel was formed in regions of the liquid crystal recording layer irradiated with the ultraviolet light and visible light and the image information according to the photo mask has been recorded.

This information-recording medium in this state was illuminated with white light from the back surface thereof, whereby the image information recorded was displayed by virtue of a difference in light transmittance between nematic gel and cholesteric gel.

The information-recording medium was retained for 5 minutes in a state heated in such a manner that the temperature of the liquid crystal recording layer reached 120° C., whereby the image information was erased. This information-recording medium could be used again in the same manner as described above.

As apparent from the results described above, the photo-responsive liquid crystal composition according to the present invention can exist in any state of gel of a first phase and gel of a second phase different from the first phase and can undergo changes in state between the gel of the first phase and the gel of the second phase.

According to the information-recording medium and information-recording process of the present invention, information can be recorded by a new method by utilizing the photo-responsive liquid crystal composition as a recording layer.

As described above, in the photo-responsive liquid crystal composition according to the present invention, the gelling agent mixed with the liquid crystalline compound is a photochromic compound having a group capable of forming an intermolecular hydrogen bond in its molecule as well as a specific photo-responding site, whereby the chirality of the gelling agent is reflected on the liquid crystalline compound according to the change in gelling ability due to photo-isomerization of the gelling agent, i.e., the change in solubility thereof in the liquid crystalline compound. As a result, a gelled nematic liquid crystal, for example, can be changed to a cholesteric phase of a sol state, and this cholesteric phase of the sol state can be further changed to a cholesteric phase of a gel state. The photo-responsive liquid crystal composition can thereby exist in any state of gel of a first phase and gel of a second phase different from each other and can undergo changes in state between the gel of the first phase and the gel of the second phase.

According to this composition, a state that the gel of the second phase has stably coexisted in a selected region or regions of a matrix of the gel of the first phase can be formed, so that information by proper light or image information can be recorded by utilizing the characteristics.

Further, the recording layer is heated, whereby the whole recording layer can be changed to an isotropic phase, thereby erasing the information recorded in the recording layer. In addition, the recording layer can be used in recording of new information.

According to the information-recording medium of the present invention, there is thus provided a medium capable of recording and erasing information by a new method by utilizing the photo-responsive liquid crystal composition as a recording layer.

In addition, according to the information-recording process of the present invention, information can be recorded and erased by a new method by utilizing the information-recording medium described above.

What is claimed is:

1. A photo-responsive liquid crystal composition comprising a liquid crystalline compound, and a gelling agent in an amount of 0.05 to 30% by mass, based on the composition, mixed with the liquid crystalline compound to form a gelling mixture, wherein
the gelling agent consists of a photochromic compound having a group capable of forming an intermolecular hydrogen bond in its molecule as well as a photo-responding site derived from at least one of an azobenzene structure, a spiropyran structure, a fulgide structure and a diarylethene structure, and wherein
the composition is capable of existing in any state of gel of a first phase and gel of a second phase different from the first phase and is capable of undergoing changes in phase state between the gel of the first phase and the gel of the second phase at a specific temperature due to the photochromic property of the gelling agent.

2. The photo-responsive liquid crystal composition according to claim 1, wherein the gelling agent is an azobenzene compound represented by the following general formula (1):

General formula (1)

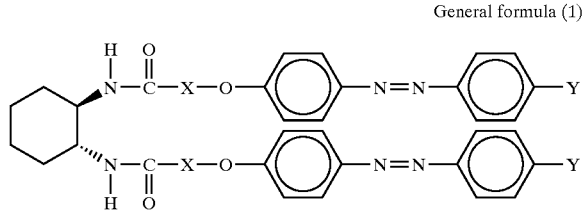

wherein X is a divalent organic group, and Y is a monovalent organic group.

3. An information-recording medium comprising a recording layer formed by the photo-responsive liquid crystal composition according to claim 1.

4. An information-recording process making use of the information-recording medium according to claim 3, which comprises the step of irradiating a selected region of the recording layer of the information-recording medium with light according to information to be recorded, thereby forming an information-recorded portion of the gel of the second phase of a pattern according to the information in a matrix of the gel of the first phase, and fixing the information to the recording layer.

5. An information-recording process, comprising the steps of irradiating a recording layer formed by a photo-responsive liquid crystal composition composed of a nematic liquid crystalline compound and the gelling agent according to claim 1 with ultraviolet light according to information to be recorded in a state that the phase of the recording layer is nematic gel, thereby changing a selected region of the nematic phase to a cholesteric phase of a sol state, irradiating the cholesteric phase of the sol state with visible light, thereby changing the cholesteric phase of the sol state to a cholesteric phase of a gel state to form an information-recorded portion of the cholesteric phase of the gel state of a pattern according to the information in a matrix of the nematic phase of the gel state, and fixing the information to the recording layer.

6. The information-recording process according to claim 5, which further comprises the step of heating the recording layer having the cholesteric phase of the gel state, thereby changing the whole phase of the recording layer to nematic gel to erase the fixed information.

7. An information-recording medium comprising a recording layer formed by the photo-responsive liquid crystal composition according to claim 2.

8. An information-recording process making use of the information-recording medium according to claim 7, which comprises the step of irradiating a selected region of the recording layer of the information-recording medium with light according to information to be recorded, thereby forming an information-recorded portion of the gel of the second phase of a pattern according to the information in a matrix of the gel of the first phase, and fixing the information to the recording layer.

9. An information-recording process, comprising the steps of irradiating a recording layer formed by a photo-responsive liquid crystal composition composed of a nematic liquid crystalline compound and the gelling agent according to claim 2 with ultraviolet light according to information to be recorded in a state that the phase of the recording layer is nematic gel, thereby changing a selected region of the nematic phase to a cholesteric phase of a sol state, irradiating the cholesteric phase of the sol state with visible light, thereby changing the cholesteric phase of the sol state to a cholesteric phase of a gel state to form an information-recorded portion of the cholesteric phase of the gel state of a pattern according to the information in a matrix of the nematic phase of the gel state, and fixing the information to the recording layer.

10. The information-recording process according to claim 9, which further comprises the step of heating the recording layer having the cholesteric phase of the gel state, thereby changing the whole phase of the recording layer to nematic gel to erase the fixed information.

* * * * *